United States Patent
Peng et al.

(10) Patent No.: US 9,940,057 B2
(45) Date of Patent: Apr. 10, 2018

(54) I/O STATISTIC BASED DEPOPULATION OF STORAGE RANKS

(71) Applicant: International Business Machines Corporation, Armonk, NY (US)

(72) Inventors: Yao Peng, Shanghai (CN); Qiang Xie, Shanghai (CN); Zhen Xing Yang, Shanghai (CN); Tang Ren Yao, Shanghai (CN); Hui Zhang, Shanghai (CN); Jing Zhou, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 170 days.

(21) Appl. No.: 14/887,374

(22) Filed: Oct. 20, 2015

(65) Prior Publication Data

US 2017/0109094 A1    Apr. 20, 2017

(51) Int. Cl.
  *G06F 12/00*   (2006.01)
  *G06F 3/06*    (2006.01)

(52) U.S. Cl.
  CPC .......... *G06F 3/0638* (2013.01); *G06F 3/0604* (2013.01); *G06F 3/0683* (2013.01)

(58) Field of Classification Search
  CPC ..... G06F 3/0638; G06F 3/0604; G06F 3/0683
  See application file for complete search history.

(56) References Cited

U.S. PATENT DOCUMENTS

| | | | |
|---|---|---|---|
| 5,893,139 A * | 4/1999 | Kamiyama | G06F 12/122 711/113 |
| 7,581,061 B2 | 8/2009 | Miyagaki et al. | |
| 8,224,782 B2 | 7/2012 | Murase | |
| 8,370,597 B1 | 2/2013 | Chatterjee et al. | |
| 8,380,891 B2 | 2/2013 | Hyde, II et al. | |
| 8,380,947 B2 | 2/2013 | Chiu et al. | |
| 8,627,004 B2 | 1/2014 | Montgomery | |
| 9,026,765 B1 * | 5/2015 | Marshak | G06F 3/061 711/114 |
| 2006/0047923 A1 * | 3/2006 | Kodama | G06F 3/0626 711/161 |
| 2012/0272030 A1 * | 10/2012 | Jennas, II | G06F 3/0611 711/165 |
| 2012/0278668 A1 * | 11/2012 | Chiu | G06F 12/02 714/700 |
| 2013/0046950 A1 | 2/2013 | Coronado et al. | |

* cited by examiner

*Primary Examiner* — Charles Rones
*Assistant Examiner* — Nanci Wong
(74) *Attorney, Agent, or Firm* — Christopher McLane

(57) ABSTRACT

The method includes identifying, by one or more computer processors, at least one source rank selected for depopulation in a storage pool. The method further includes identifying, by one or more computer processors, one or more source extents for depopulation, wherein the identified one or more source extents belongs to the identified at least one source rank selected for depopulation. The method further includes obtaining, by one or more computer processors, for each identified source extent of the identified one or more source extents to be depopulated, at least one I/O workload. The method further includes sorting, by one or more computer processors, the one or more source extents to be depopulated, based at least in part on the at least one I/O workload for each identified source extent of the identified one or more source extents.

17 Claims, 4 Drawing Sheets

I/O STATISTIC BASED DEPOPULATION OF STORAGE RANKS

BACKGROUND

The present invention relates to a storage system, and more specifically, to depopulation of storage ranks.

High-end storage systems use virtualization to provide advanced features such as on demand support. In these storage systems, physical storage resources such as physical disk drives can be virtualized into ranks, extents, extent pools and logical volumes. A rank is normally created based on a group of physical disk drives which have been formatted into one Redundant Array of Inexpensive Disks (RAID) type. The available space of a rank is divided into extents of same size. All the extents from a set of ranks are formed into an extent pool. A logical volume is composed of a set of extents from one extent pool. The logical volumes are represented to hosts and servers in such a way that the hosts and servers see the logical volumes as if they were physical storage resources such as physical disk drives.

Rank depopulation is a method of migrating all the data from the selected ranks to other ranks in the same storage pool so that the depopulated ranks can be freed and be ready for use in other storage pools for resource reconfiguration. Storage System often supplies tools to help users do such task. The method normally migrates the data from the selected ranks sequentially, extent by extent. Such operation often takes hours or even days to finish in real product environment when depopulating large capacity ranks.

SUMMARY

Embodiments of the present invention disclose a method, computer program product, and system for depopulation of storage ranks. In one embodiment, in accordance with the present invention, the computer-implemented method includes identifying, by one or more computer processors, at least one source rank selected for depopulation in a storage pool. The method further includes identifying, by one or more computer processors, one or more source extents for depopulation, wherein the identified one or more source extents belongs to the identified at least one source rank selected for depopulation. The method further includes obtaining, by one or more computer processors, for each identified source extent of the identified one or more source extents to be depopulated, at least one I/O workload. The method further includes sorting, by one or more computer processors, the one or more source extents to be depopulated, based at least in part on the at least one I/O workload for each identified source extent of the identified one or more source extents.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein. On the contrary, the embodiments disclosed herein are provided for the thorough and complete understanding of the present disclosure, and completely conveying the scope of the present disclosure to those skilled in the art.

As mentioned above, rank depopulation is a method to free some ranks in an extent pool and make the free rank extents usable to other extent pools. Rank depopulation is required to migrate all the data from the extents which belong to the selected ranks to other extents in the same extent pool. The migration is transparent to hosts, which means that input/output (I/O) transactions should not be affected during the method.

However, heavy I/O transactions, especially write operations, will cause "duplicate migration" during rank depopulation, such that the overall time taken under heavy I/O transactions may be tens times longer than the one taken without I/O transactions, thereby slowing down the speed of data migration. As an example, for one GB data, rank depopulation takes only about 5 seconds to move out. However, rank depopulation takes about 150 seconds if there are heavy I/O transactions. Data in a storage system is separated into customer data (user data) and meta data (control data). During data migration, the customer data will be migrated first and then the meta data will be migrated, thereby causing the difference in times. If a write operation happens (i.e., new customer data is written to the source but not the target) before the meta data migration, the migrated but changed customer data needs to be migrated again to meet the non-disruptive I/O requirement. As a result, the whole depopulation may take longer because of the slow migration when there are heavy I/O transactions.

The current disclosure proposes a solution to avoid the "duplicate migration" as much as possible, such that the overall time taken for a whole rank depopulation can be reduced dramatically (e.g., tens times shorter). As an example, a solution for depopulation of storage ranks may include an I/O monitor, a collector, a migration planner and a migration executer. The I/O monitor may monitor I/O statistics for extents and ranks. The collector may obtain the monitored I/O statistics and determine I/O workloads based on the I/O statistics. The migration planner may obtain the determined I/O workloads, and generate a migration plan based on the I/O workloads, and adjust the migration plan as needed. The migration executer may execute the migration plan. Hereinafter, the details of the solution will be described with reference to FIGS. 1-6.

Figure 1:
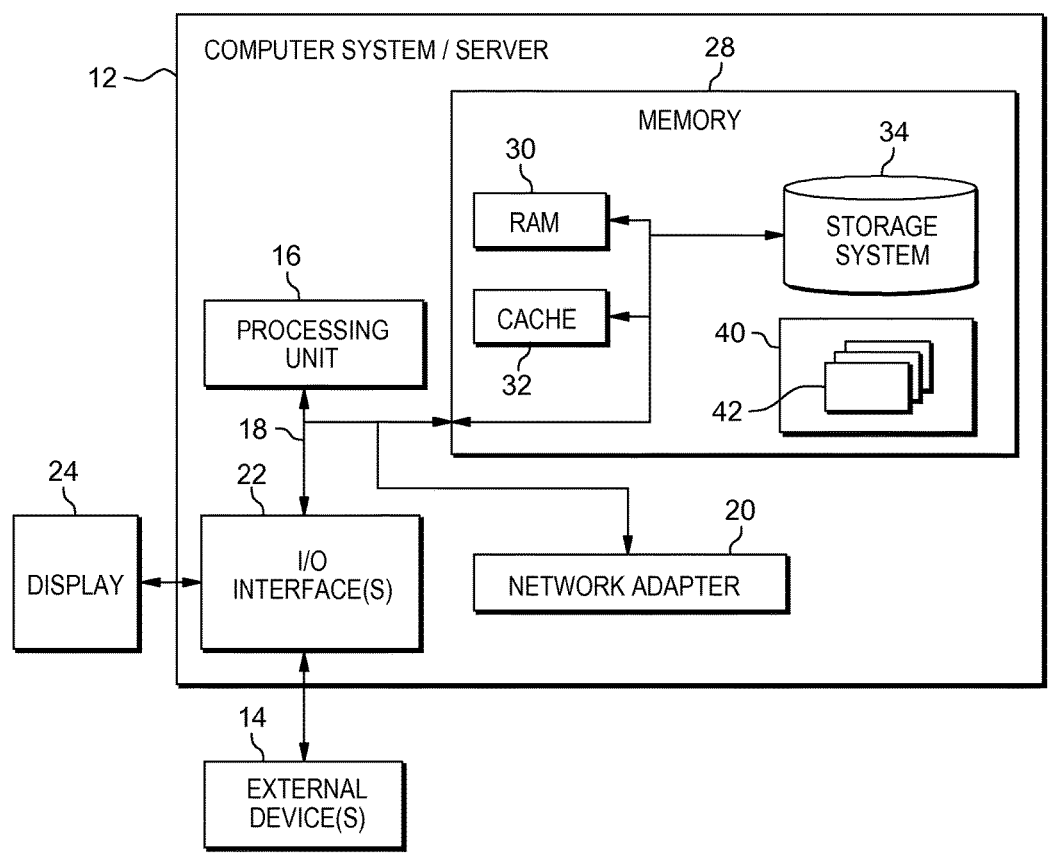
FIG. 1 shows an exemplary computer system which is applicable to implement the embodiments of the present invention.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and computer system readable media includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
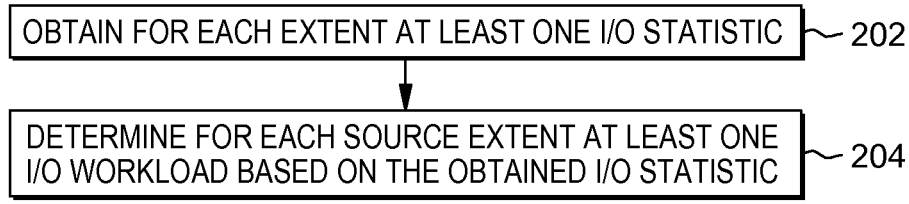
FIG. 2 is a flow chart showing a method for implementing a collector in a computer according to an exemplary embodiment of the present invention.

FIG. 2 is a flow chart showing a method for implementing a collector in a computer according to an exemplary embodiment of the present invention. In step 202, program 612 may obtain at least one I/O statistic for each extent in a storage pool at different time points. The at least one I/O statistic may be obtained from an I/O monitor as mentioned above. The I/O monitor may monitor I/O statistics for extents and ranks, and may be implemented for example by using any existing technology for monitoring I/O statistics of storage devices (e.g., by using block I/O subsystem in Linux™ Kernel). The I/O statistics may include but not limited to a count of I/O transactions, a data amount of I/O transactions and so on. As an example, the I/O monitor may be embodied as an I/O counter configured to count the number of I/O transactions on extents and ranks. The count may be rank and extent based, like <rankNum, extNum, readCount, writeCount, . . . >. When an I/O transaction is finished, the corresponding readCount or writeCount is updated.

The interval between the different time points may be, for example, regular or non-regular. In the former case, the cycle for obtaining the I/O statistic may be, for example, equal to a short time interval for determining a short-term I/O workload, which will be described later with reference to step 204. Alternatively, the cycle may also be smaller than the short time interval (e.g., n times as small as the short time interval, where n is an integer and n≥2).

Program 612 may, for example, record the obtained at least one I/O statistic for each extent. In the above former case, the cycle for recording the I/O statistic may be the same as that for obtaining the I/O statistic. In order to save the storage space for recording the I/O statistic, the number of cycles for which the I/O statistic is recorded may be set as a fixed number equaling to a long time interval divided by the cycle for recording the I/O statistic, or may be slightly larger than this fixed number. The long time interval may be used for determining a long-term I/O workload, which will be described later with reference to step 204. In an example, the number of cycles for which the I/O statistic is recorded has reached the set number, when the I/O statistic is recorded for a new cycle, the I/O statistic recorded for the oldest cycle may be deleted such that the storage space can be saved.

In step 204, program 612 may determine, for each source extent to be depopulated, at least one I/O workload based at least in part on the obtained at least one I/O statistic, wherein the source extent belongs to at least one source rank selected for depopulation in the storage pool. This step may be performed for example in response to a request from a migration planner which will be described later. The request may contain, for example, the rank number of the at least one source rank selected for depopulation.

Optionally, program 612 may determine, for each source rank to be depopulated, at least one I/O workload based at least in part on the obtained at least one I/O statistic. Further, program 612 may determine at least one I/O workload for each remaining rank other than the at least one source rank in the storage pool.

As an example, the at least one I/O workload may include a short-term I/O workload and a long-term I/O workload. The short-term I/O workload represents an I/O workload during a previous short time interval (e.g., from the current time). The current time may be, for example, the time point at which a request is received from the migration planner. The short time interval may be defined by a user (e.g., a value on the order of minutes, such as 5 minutes). Alternatively, the short time interval may also be set by applying any suitable machine learning algorithms to depopulation history data to find the optimum value, where the depopulation history data may be obtained by means of different short time intervals. As an example, assume the cycle for recording the I/O statistic is equal to the short time interval, then the short-term I/O workload may be determined by calculating the delta amount between the I/O statistic recorded for the newest cycle and the I/O statistic recorded for the cycle which is immediately before the newest cycle. In the above example where the I/O monitor is embodied as an I/O counter, the short-term I/O workload may be determined as <rankNum, extNum, deltaReadCount_short, deltaWriteCount_short, . . . >, which may reflect how busy the I/O transaction is in the short time interval.

Similarly, the long-term I/O workload represents an I/O workload during a previous long time interval (e.g., from the current time). For example, the current time may be the time point at which a request is received from the migration planner. The long time interval may be defined by a user (e.g., a value on the order of hours, such as 24 hours). Alternatively, the long time interval may also be set by applying any suitable machine learning algorithms. As an example, assume that the cycle for recording the I/O statistic is equal to the short time interval and $N_{ratio}$ denotes an integer obtained by dividing the long time interval by the short time interval, then the long-term I/O workload may be determined by calculating the delta amount between the I/O statistic recorded for the newest cycle and the I/O statistic recorded for the cycle that is apart from the newest cycle by ($N_{ratio}$-1) cycles. In the above example where the I/O monitor is embodied as an I/O counter, the long-term I/O workload may be determined as <rankNum, extNum, deltaReadCount_long, deltaWriteCount_long, . . . >, which may reflect how busy the I/O transaction is in the long time interval.

Optionally, program 612 may determine, for each source rank to be depopulated, a short-term I/O workload and a long-term I/O workload. Further, program 612 may determine a short-term I/O workload and a long-term I/O workload for each remaining rank other than the at least one source rank in the storage pool. However, the present disclosure is not so limited, and program 612 may only determine a short-term I/O workload for each remaining rank. As an example, the short-term I/O workload for a rank may be determined for instance by calculating the sum of the short-term I/O workloads for all extents belonging to the rank. Likewise, the long-term I/O workload for a rank may be determined for instance by calculating the sum of the long-term I/O workloads for all extents belonging to the rank.

Figure 3:
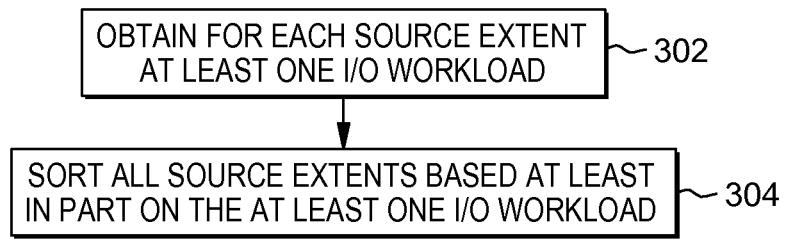
FIG. 3 is a flow chart showing a method for implementing a migration planner in a computer according to an exemplary embodiment of the present invention.

FIG. 3 is a flow chart showing a method for implementing a migration planner in a computer according to an exemplary embodiment of the present invention. In step 302, program 612 may obtain, for each source extent to be depopulated, at least one I/O workload, wherein the source extent belongs to at least one source rank selected for depopulation in a storage pool. This step may be performed for example in response to a depopulation request from a user. The depopulation request may contain for example the rank number of the at least one source rank selected for depopulation. In response to the depopulation request, the migration planner may send to the collector a request for obtaining the I/O workload. The details of the I/O workload have been described with reference to step 204 in FIG. 2, and will be omitted here. Optionally, the migration planner may obtain, for each source rank to be depopulated, at least one I/O workload.

Then, in step 304, program 612 may sort all source extents to be depopulated, based at least in part on the at least one I/O workload for each source extent. As an example, this step may include dividing all source extents to be depopulated, into four groups with different priorities based on the short-term and long-term I/O workloads, and sorting all source extents of each group based on the value of the short-term I/O workload for each source extent. Step 304 may be implemented as for example steps 402-408 in FIG. 4, which will be described later. Optionally, program 612 may adjust the order of the sorted source extents belonging to each source rank, based on the at least one I/O workload for the source rank. This optional step will also be described later with reference to steps 402-408 in FIG. 4.

Figure 4:
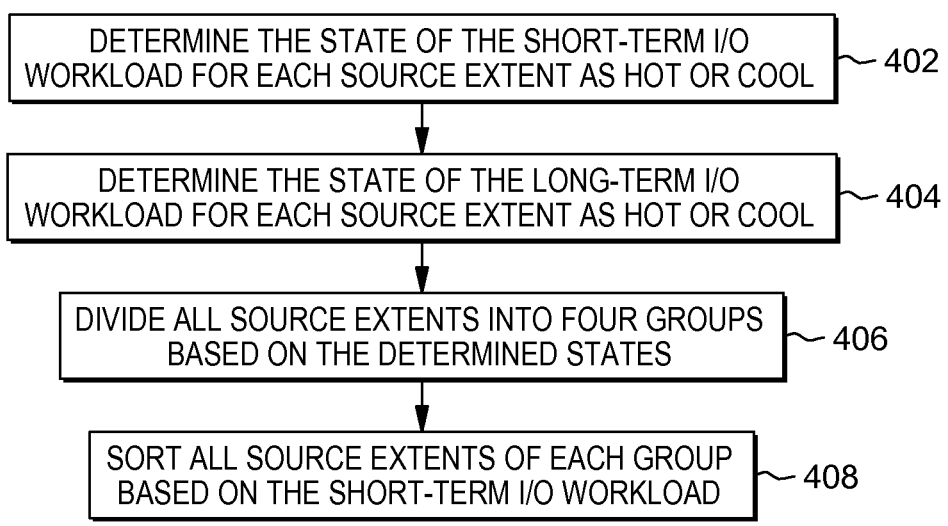
FIG. 4 is a flow chart for explaining the operations in a sorting step of FIG. 3.

FIG. 4 is a flow chart for explaining the operations in a sorting step of FIG. 3. In step 402, program 612 may determine the state of the short-term I/O workload for each source extent as short-term hot or short-term cool. As an example, program 612 may check whether the short-term I/O workload for each source extent is larger than or equal to a first threshold. Similarly as the short and long time intervals, the first threshold may be defined by a user (e.g., as an average value of the short-term I/O workloads for all the source extents to be depopulated). Alternatively, the first threshold may also be set by applying any suitable machine learning algorithms to depopulation history data to find the optimum value, where the depopulation history data may be obtained by means of different first thresholds.

In response to a positive check result (i.e., the short-term I/O workload is larger than or equal to the first threshold), program 612 may determine the state of the short-term I/O workload for the source extent as short-term hot. On the other hand, in response to a negative result (i.e., the short-term I/O workload is smaller than the first threshold), program 612 may determine the state of the short-term I/O workload for the source extent as short-term cool.

Then, in step 404, program 612 may determine the state of the long-term I/O workload for each source extent as long-term hot or long-term cool. As an example, program 612 may check whether the long-term I/O workload for each source extent is larger than or equal to a second threshold. Likewise, the second threshold may be defined by a user (e.g., as an average value of the long-term I/O workloads for all the source extents to be depopulated). Alternatively, the second threshold may also be set by applying any suitable machine learning algorithms.

In response to a positive check result (i.e., the long-term I/O workload is larger than or equal to the second threshold), program 612 may determine the state of the long-term I/O workload for the source extent as long-term hot. On the other hand, in response to a negative result (i.e., the long-term I/O workload is smaller than the second threshold), program 612 may determine the state of the long-term I/O workload for the source extent as long-term cool.

Then, in step 406, program 612 may divide all source extents to be depopulated, into four groups based on the states of the short-term and long-term I/O workloads for each source extent. The four groups arranged in a descending order of priority are a first group with long-term hot and short-term cool, a second group with long-term cool and short-term cool, a third group with long-term cool and short-term hot, and a fourth group with long-term hot and short-term hot.

At first, the hotter the short-term I/O workload is, the higher the possibility of "duplicate migration" is. Thus, the first two groups take priority over the latter two groups. As to the first two groups, the first group takes priority over the second group because from long term the group is hot, so the faster it is migrated, the better. As to the latter two groups, the third group takes priority over the fourth group because the fourth group with both short-term and long-term I/O workloads being hot has a higher possibility of "duplicate migration" than the third group with only short-term I/O workload being hot.

Then, in step 408, program 612 may sort all source extents of each group based on the value of the short-term I/O workload for each source extent. This step may be only based on the short-term I/O workload because it is desirable to finish the migration for each group as fast as possible. Further, since the hotter the short-term I/O workload is, the higher the possibility of "duplicate migration" is, program 612 may sort all source extents of each group in an ascending order of the short-term I/O workload. In this way, all the source extents to be depopulated can be sorted.

As mentioned above, in rank depopulation the write operations impact most. Thus, in the above steps in FIGS. 2-4, the I/O statistic may be merely the statistic of write operations, and thus the I/O workload may be merely the write workload. However, the present disclosure is not so limited, and the I/O workload may also be a weighted sum of write workload and read workload. As an exemplary example, the weight for the write workload is 95%, and the weight for the read workload is 5%. However, it should be noted that any other suitable weights may be used.

In the above example shown in FIGS. 3 and 4, only the I/O workloads for source extent are considered. As another example, the short-term I/O workload for each source rank to be depopulated may also be considered in sorting all source extents of each group. In other words, the order of the sorted source extents in FIGS. 3 and 4 may be adjusted based on the at least one I/O workload for each source rank. For example, when the short-term I/O workloads of any two source extents are substantially same with each other (e.g., the difference between both is smaller than a threshold) and the two source extents belong to different ranks, the source extent belonging to the rank with smaller short-term I/O workload may take priority over the other source extent.

As a further example, both the short-term and long-term I/O workloads for each source rank to be depopulated may be considered in the above dividing step. For instance, the at least one source rank selected for depopulation may be divided into the four groups with different priorities based on the states of the short-term and long-term I/O workloads for each source rank, as described above. Then the priority of a source rank may be the priority of the group to which the source rank belongs, and may be set as the highest priority that all the source extents of the source rank may take. For example, if a source rank is grouped into the second group but a source extent of the source rank is grouped into the first group, then this source extent may be adjusted to belong to the second group.

It should be noted that the present disclosure is not so limited. As a simplest example, the migration planner may consider merely the short-term I/O workload for each source extent. For instance, the migration planner may sort all the source extents to be depopulated, in an ascending order of the short-term I/O workload.

After the operation of step 408 has been finished, all the source extents to be depopulated can be sorted. As to the target extent for holding the data migrated from each source extent, as a simplest example, the migration planner may determine the remaining ranks other than the at least one source rank, and sequentially or randomly select a free extent from the remaining ranks as the target extent. As another example, the target extent selection algorithm may vary depending on the requirement of the use. For instance, the algorithm may select only one single destination rank (which is not efficient), or spread the extents to different ranks in a round-robin manner or by using an adaptive method. Optionally, the migration planner may also consider the rank workload when selecting the target extent, to balance the overall I/O workload for the whole storage pool during and after the rank depopulation. This optional method will be described with reference to FIG. 5.

Figure 5:
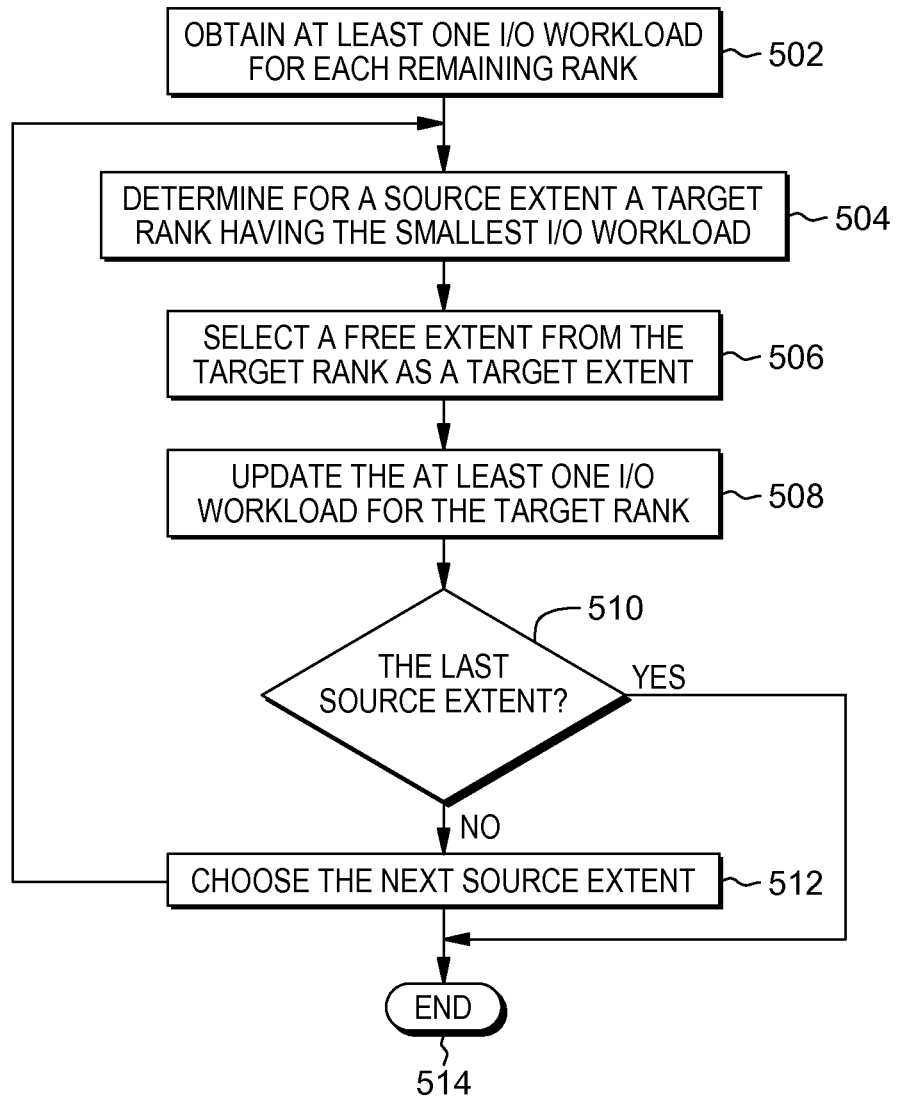
FIG. 5 is a flow chart showing an optional method for implementing a migration planner in a computer according to an exemplary embodiment of the present invention.

FIG. 5 is a flow chart showing an optional method for implementing a migration planner in a computer according to an exemplary embodiment of the present invention. In step 502, program 612 may obtain at least one I/O workload for each remaining rank other than the at least one source rank in the storage pool. This step may be performed for example in response to a depopulation request from a user, and may be combined with step 302 into one step. Then, the migration planner may determine, for each source extent to be depopulated, a target extent from the remaining ranks, based at least in part on the at least one I/O workload for each remaining rank. This may be implemented as for example steps 504-514.

In step 504, program 612 may determine, for the source extent, a target rank having the smallest I/O workload from the remaining ranks. The I/O workload in step 504 may be the short-term I/O workload or the long-term I/O workload. Alternatively, a weighted sum of the short-term and long-term I/O workloads may be used as a measure for determining the smallest I/O workload.

As an example, from the remaining ranks, the target rank may be selected to have the same tier as the source extent if possible. For instance, if the source extent is of Solid State Drive (SSD) type, then a target rank of SSD type may be selected if possible. In this way, the tier configuration may be maintained as much as possible before and after the rank depopulation. However, if the actual situation fails to meet this requirement, any existing tier adjustment technology may be used to perform the tier adjustment task.

Then, in step 506, program 612 may select, for the source extent, a free extent from the target rank as a target extent. The free extent in this step may refer to a blank extent having no data stored therein. Then, in step 508, program 612 may update the at least one I/O workload for the target rank in accordance with the at least one I/O workload for the source extent. As an example, program 612 may add the at least one I/O workload for the source extent to the at least one I/O workload for the target rank. In this way, the updated I/O workload for this rank may be considered when selecting a target extent for the next source extent. Similarly as step 504, the I/O workload in step 508 may be the short-term I/O workload or the long-term I/O workload. Alternatively, a weighted sum of the short-term and long-term I/O workloads may be used.

Then, in decision 510, program 612 may check whether the current source extent is the last source extent in response to a negative check result (i.e., the current source extent is not the last source extent). If the current source extent is not the last source extent (no branch, decision 510) then program 612 may choose the next source extent as the current source extent in step 512. Then, steps 504-510 may be repeated for the next source extent to select a corresponding target extent for it. If the current source extent is the last source extent (yes branch, decision 510), then in response to a positive check result (i.e., the current source extent is the last source extent), program 612 may end in step 514.

In this way, all the source extents to be depopulated have their corresponding target extents. Each source extent and the source extent's target extent may constitute a migration entry like <rankNum_source, extNum_source, rankNum_target, extNum_target>. Further, a list of all the migration entries corresponding to all the source extents to be depopulated may constitute a migration plan. As described above, the source extent of the first entry has the highest priority in the four quadrant selection, and the target extent of the first entry has the smallest I/O workload from the target ranks.

Optionally, the migration planner may adjust the order of the sorted source extents in accordance with a restriction on an amount of extents in same one rank being operated concurrently. For example, for magnetic disk drives, there is usually a restriction on concurrent executions in same one rank (e.g., for one time, only a maximum number of read or write operations can be executed in same one rank). Thus, the migration planner may check whether there are more than the maximum number of consecutive migration entries having the same rank number. If so, the migration planner may insert into the consecutive migration entries at least one subsequent migration entry which follows the consecutive migration entries. In this way, the migration efficiency can be improved.

Further, optionally, the migration planner may adjust the order of the sorted target extents in accordance with a restriction on an amount of extents in same one rank being operated concurrently. This may be implemented in a similar way as the source extents.

Then, the migration planner may send the migration plan to a migration executer. The migration executer may execute the migration plan, and may be implemented by using any existing data migration technology (e.g., by using block I/O mechanisms in Linux™ Kernel).

Optionally, step 204 of FIG. 2 about the collector as well as steps 302-304 of FIG. 3, steps 402-408 of FIG. 4 and steps 502-514 of FIG. 5 about the migration planner may be performed periodically. The cycle of performing the above steps may be referred to as a migration plan cycle, which will be described below in details.

As an example, in response to a depopulation request from a user, the migration planner may perform step 302 (and optionally step 502) to obtain for each source extent to be depopulated (and optionally for each remaining rank), the at least one I/O workload by for example sending a request to the collector. In response to this request from the migration planner, the collector may perform step 204 to determine, for each source extent to be depopulated, at least one I/O workload. Optionally, the collector may determine, for each remaining rank, at least one I/O workload.

Then, the migration planner may perform step 304 (e.g., steps 402-408) to sort all source extents to be depopulated, and may optionally perform steps 504-514 to determine a target extent for each source extent, thereby generating a migration plan. Then the migration planner may send the migration plan to the migration executer for execution. For example, the migration planner may send the migration entries in batches to the migration executer. The migration executer may send back to the migration planner the migration result for each batch of migration entries. For an unsuccessful migration entry, the migration planner may check whether the migration planner needs retry immediately. If migration planner needs retry immediately, the migration planner may insert migration entree to the front of the remaining migration entries which have not been sent to the migration executer. On the other hand, if the migration planner does not need retry immediately, the migration planner may append the migration entree to the end of the remaining migration entries.

During the migration execution, the migration planner may check whether the migration plan is empty. If the migration plan is empty, which means that all the source extents have been migrated out, the depopulation process may end. On the other hand, if the migration plan is not empty (i.e., there are still migration entries in the migration plan), the migration planner may check whether it is time to start a new migration plan cycle. For example, the start time (e.g., the time point where the at least one I/O workload is received from the collector) may be recorded as Tstart, and the migration planner may calculate the delta time Tdelta=Tcurrent−Tstart (where Tcurrent denotes the current time), and check whether the delta time has reached the migration plan cycle. The migration plan cycle may equal to the short time interval for determining the short-term I/O workload, or may be n times as large as the short time interval (where n is an integer and n≥2).

If a determination is made not to start a new migration plan cycle, the migration planner may proceed to send the migration entries in batches to the migration executer. On the other hand, if a determination is made to start a new migration plan cycle, the migration planner may perform step 302 (and optionally step 502) again to obtain for each source extent to be depopulated (and optionally for each remaining rank), the at least one I/O workload by for example sending a request to the collector. At this time, each source extent to be depopulated means each remaining extent which has not been migrated out in the previous cycle(s). Since the migration planner may receive the migration result sent back from the migration executer, the migration planner may determine the remaining source extents and ranks, and send the numbers of the remaining source extents and ranks to the collector in the request. In response to this request from the migration planner, the collector may perform step 204 again to determine, for each remaining source extent, at least one I/O workload. Optionally, the collector may determine, for each remaining rank, at least one I/O workload again.

Then, the migration planner may perform step 304 (e.g., steps 402-408) again to sort all remaining source extents, and may optionally perform steps 504-514 again to determine a target extent for each remaining source extent, thereby generating a migration plan. Then the migration planner may send the migration plan to the migration executer for execution. In this way, the above steps of FIGS. 2-5 may be performed periodically.

Figure 6:
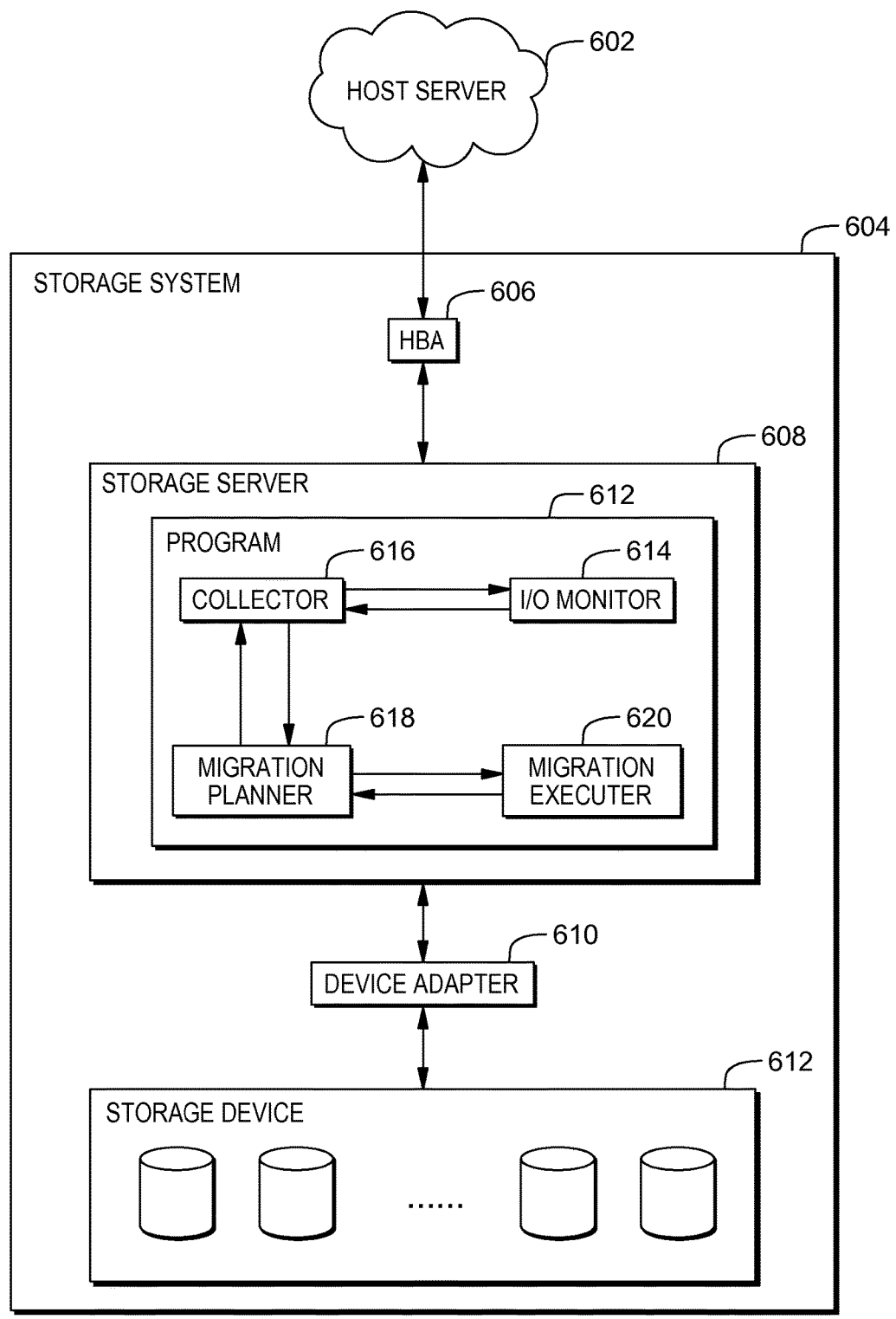
FIG. 6 is a block diagram showing an exemplary storage system into which a method according to an exemplary embodiment of the present invention may be applied.

FIG. 6 is a block diagram showing an exemplary storage system into which a method according to an exemplary embodiment of the present invention may be applied. As shown, the system of FIG. 6 may include a host server 602 and a storage system 604. The host server 602 may access the storage system 604 to service a request from a client (not shown). The storage system 604 may include a host bus adapter (HBA) 606, a storage server 608, a device adapter 610 and a storage device 612. The HBA 606 may connect the host server 602 and the storage server 608. The storage server 608 may be a fully configured computer system which may contain processors, caches, and a memory. There may be several storage servers 608 in one instance of storage system 604, and these storage servers 608 may communicate with each other based on exist technologies such as Peripheral Component Interface Express (PCIE). The device adapter 610 may connect the storage server 608 and a physical storage device 612. The storage device 612 may include Solid State Drives (SSDs), Serial Attached SCSI Hard Disk Drives (SAS HDDs, SCSI refers to Small Computer Standard Interface), Serial Advanced Technology Attachment HDDs (SATA HDDs) and so on. The physical disk drives in the storage device 612 may be normally formatted into one or more Redundant Array of Inexpensive Disks (RAID) types. It should be noted that although FIG. 6 only shows one set of HBA, storage server and device adapter, there may be two or more sets of HBAs, storage servers and device adapters.

As shown, the storage server 608 may include program 612 as a stand alone program that communicates with an I/O monitor 614, a collector 616, a migration planner 618 and a migration executer 620. In other embodiments, program 612 may include functions of program 612 for performing the same functions as an I/O monitor 614, a collector 616, a migration planner 618 and a migration executer 620. In response to a depopulation request received via the host server 602 from a client, program 612 may accomplish the depopulation task as described above. The impelemention details of program 612 has been described above in details, and thus will be omitted here.

Based on the above description, the following advantageous technical effects can be achieved in the present disclosure. Firstly, the impact of I/O transactions can be minimized to fasten the data migration. Secondly, during the depopulation process to the extents which have less I/O transactions, it is possible that the heavy transactions happening on other extents finish. As a result, the whole depopulation process can become faster.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for depopulation of storage ranks, the method comprising:
   identifying, by one or more computer processors, at least one source rank selected for depopulation in a storage pool;
   identifying, by one or more computer processors, one or more source extents for depopulation, wherein the identified one or more source extents belongs to the identified at least one source rank selected for depopulation;
   obtaining, by one or more computer processors, for each identified source extent of the identified one or more source extents to be depopulated, at least one I/O workload;
   sorting, by one or more computer processors, the one or more source extents to be depopulated, based at least in part on the at least one I/O workload for each identified source extent of the identified one or more source extents;
   determining, by one or more computer processors, a state of a short-term I/O workload for each source extent;
   determining, by one or more computer processors, a state of a long-term I/O workload for each source extent;
   dividing, by one or more computer processors, all source extents to be depopulated into four groups, wherein the four groups comprise short-term hot, short-term cool, long-term hot, long-term cool, with different priorities based on the determined state of the short-term I/O workload and the determined state of the long-term I/O workload for each source extent;
   sorting, by one or more computer processors, all source extents of the determined four groups based on a value of the short-term I/O workload for each source extent;
   generating, by one or more computer processors, a migration plan based on the sorted all source extents, wherein the migration plan identifies a target extent for each source extent for migration; and
   executing, by one or more computer processors, the generated migration plan.

2. The method of claim 1, further comprising:
   obtaining, by one or more computer processors, for each source rank to be depopulated, at least one I/O workload; and
   adjusting, by one or more computer processors, an order of the sorted one or more source extents belonging to the identified at least one source rank, based on the at least one I/O workload for the at least one source rank.

3. The method of claim 1, wherein obtaining for each one of the identified one or more source extents to be depopulated, at least one I/O workload comprises:
   obtaining, by one or more computer processors, for each source extent, the short-term I/O workload, wherein the short-term I/O workload represents an I/O workload during a previous short time interval; and
   obtaining, by one or more computer processors, for each source extent, the long-term I/O workload, wherein the long-term I/O workload represents an I/O workload during a previous long time interval.

4. The method of claim 1, wherein sorting the one or more source extents to be depopulated, based at least in part on the at least one I/O workload for each source extent comprises:
   sorting, by one or more computer processors, each source extent to be depopulated, based on the short-term and long-term I/O workloads.

5. The method of claim 1, further comprising:
   obtaining, by one or more computer processors, at least one I/O workload for each additional rank other than the at least one source rank in the storage pool; and
   determining, by one or more computer processors, for each source extent to be depopulated, the target extent from the additional ranks, based at least in part on the at least one I/O workload for each additional rank.

6. The method of claim 5, wherein determining, for each source extent to be depopulated, the target extent comprises:
   determining, by one or more computer processors, for the one or more source extents to be depopulated, a target rank having a smallest I/O workload from the additional ranks;
   selecting, by one or more computer processors, for the one or more source extents to be depopulated, a free extent from the target rank as the target extent; and
   updating, by one or more computer processors, the at least one I/O workload for the target rank in accordance with the at least one I/O workload for the one or more source extents to be depopulated.

7. A computer program product for depopulation of storage ranks, the computer program product comprising:

one or more computer readable storage media and program instructions stored on the one or more computer readable storage media, the program instructions comprising:

program instructions to identify at least one source rank selected for depopulation in a storage pool;

program instructions to identify one or more source extents for depopulation, wherein the identified one or more source extents belongs to the identified at least one source rank selected for depopulation;

program instructions to obtain for each identified source extent of the identified one or more source extents to be depopulated, at least one I/O workload;

program instructions to sort the one or more source extents to be depopulated, based at least in part on the at least one I/O workload for each identified source extent of the identified one or more source extents;

determine a state of a short-term I/O workload for each source extent;

determine a state of a long-term I/O workload for each source extent;

divide all source extents to be depopulated into four groups, wherein the four groups comprise short-term hot, short-term cool, long-term hot, long-term cool, with different priorities based on the determined state of the short-term I/O workload and the determined state of the long-term I/O workload for each source extent; and sort all source extents of the determined four groups based on a value of the short-term I/O workload for each source extent;

generate a migration plan based on the sorted all source extents, wherein the migration plan identifies a target extent for each source extent for migration; and execute the generated migration plan.

8. The computer program product of claim 7, further comprising program instructions to:

obtain for each source rank to be depopulated, at least one I/O workload; and adjust an order of the sorted one or more source extents belonging to the identified at least one source rank, based on the at least one I/O workload for the at least one source rank.

9. The computer program product of claim 7, wherein obtaining for each one of the identified one or more source extents to be depopulated, at least one I/O workload comprises program instructions to:

obtain for each source extent, the short-term I/O workload, wherein the short-term I/O workload represents an I/O workload during a previous short time interval; and obtain for each source extent, the long-term I/O workload, wherein the long-term I/O workload represents an I/O workload during a previous long time interval.

10. The computer program product of claim 7, wherein sorting the one or more source extents to be depopulated, based at least in part on the at least one I/O workload for each source extent comprises program instructions to:

sort each source extent to be depopulated, based on the short-term and long-term I/O workloads.

11. The computer program product of claim 7, further comprising program instructions to:

obtain at least one I/O workload for each additional rank other than the at least one source rank in the storage pool; and determine for each source extent to be depopulated, the target extent from the additional ranks, based at least in part on the at least one I/O workload for each additional rank.

12. The computer program product of claim 11, wherein determining, for each source extent to be depopulated, the target extent comprises program instructions to:

determine for the one or more source extents to be depopulated, a target rank having a smallest I/O workload from the additional ranks;

select for the one or more source extents to be depopulated, a free extent from the target rank as the target extent; and update the at least one I/O workload for the target rank in accordance with the at least one I/O workload for the one or more source extents to be depopulated.

13. A computer system for depopulation of storage ranks, the computer system comprising:

one or more computer processors;

one or more computer readable storage media;

program instructions stored on the computer readable storage media for execution by at least one of the one or more computer processors, the program instructions comprising:

program instructions to identify at least one source rank selected for depopulation in a storage pool;

program instructions to identify one or more source extents for depopulation, wherein the identified one or more source extents belongs to the identified at least one source rank selected for depopulation;

program instructions to obtain for each identified source extent of the identified one or more source extents to be depopulated, at least one I/O workload;

program instructions to sort the one or more source extents to be depopulated, based at least in part on the at least one I/O workload for each identified source extent of the identified one or more source extents;

determine a state of a short-term I/O workload for each source extent;

determine a state of a long-term I/O workload for each source extent;

divide all source extents to be depopulated into four groups, wherein the four groups comprise short-term hot, short-term cool, long-term hot, long-term cool, with different priorities based on the determined state of the short-term I/O workload and the determined state of the long-term I/O workload for each source extent; and sort all source extents of the determined four groups based on a value of the short-term I/O workload for each source extent;

generate a migration plan based on the sorted all source extents, wherein the migration plan identifies a target extent for each source extent for migration; and execute the generated migration plan.

14. The computer system of claim 13, further comprising program instructions to: obtain for each source rank to be depopulated, at least one I/O workload; and adjust an order of the sorted one or more source extents belonging to the identified at least one source rank, based on the at least one I/O workload for the at least one source rank.

15. The computer system of claim 13, wherein obtaining for each one of the identified one or more source extents to be depopulated, at least one I/O workload comprises program instructions to:

obtain for each source extent, the short-term I/O workload, wherein the short-term I/O workload represents an I/O workload during a previous short time interval; and obtain for each source extent, the long-term I/O workload, wherein the long-term I/O workload represents an I/O workload during a previous long time interval.

16. The computer system of claim 13, wherein sorting the one or more source extents to be depopulated, based at least in part on the at least one I/O workload for each source extent comprises program instructions to:

sort each source extent to be depopulated, based on the short-term and long-term I/O workloads.

17. The computer system of claim 13, further comprising program instructions to:

obtain at least one I/O workload for each additional rank other than the at least one source rank in the storage pool; and determine for each source extent to be depopulated, the target extent from the additional ranks, based at least in part on the at least one I/O workload for each additional rank.

* * * * *